US000001022H

United States Statutory Invention Registration [19]

[11] Reg. Number: H1022

Holden et al.

[43] Published: Feb. 4, 1992

[54] SOFT PAINTABLE POLYMER COMPOSITION

[75] Inventors: Geoffrey Holden, Houston; Donald D. Briggs, Katy; Charles R. Donaho, Houston, all of Tex.

[73] Assignee: Shell Oil Company, Houston, Tex.

[21] Appl. No.: 638,953

[22] Filed: Jan. 9, 1991

[51] Int. Cl.[5] ..... C08K 5/01
[52] U.S. Cl. ..... 524/474
[58] Field of Search ..... 524/484, 504, 505

[56] References Cited

U.S. PATENT DOCUMENTS

| | | | |
|---|---|---|---|
| Re. 27,145 | 6/1971 | Jones | 260/880 |
| 3,113,986 | 12/1963 | Breslow et al. | 260/683.9 |
| 3,251,905 | 5/1966 | Zelinski | 260/879 |
| 3,265,765 | 8/1966 | Holden et al. | 260/876 |
| 3,390,207 | 6/1968 | Moss et al. | 260/879 |
| 3,598,887 | 8/1971 | Darcy et al. | 260/879 |
| 3,639,521 | 2/1972 | Hsieh | 260/880 |
| 4,208,356 | 6/1980 | Fukawa et al. | 525/89 |
| 4,219,627 | 8/1980 | Halasa et al. | 525/89 |
| 4,226,952 | 10/1980 | Halasa et al. | 525/192 |
| 4,578,429 | 3/1986 | Gergen et al. | 525/291 |
| 4,707,514 | 11/1987 | Katsuki et al. | 524/505 |
| 4,868,245 | 9/1989 | Pottick et al. | 525/98 |

*Primary Examiner*—Richard D. Lovering
*Assistant Examiner*—Joseph D. Anthony

[57] ABSTRACT

A soft paintable polymer composition comprising:

(a) from 0 to about 90 parts by weight (pbw) of a hydrogenated block copolymer comprised of at least one vinyl aromatic hydrocarbon and at least one conjugated diene, (b) from about 10 to about 100 pbw of a functionalized hydrogenated block copolymer comprised of at least one vinyl aromatic hydrocarbon and at least one conjugated diene, wherein (a) and (b) must add up to 100 pbw, (c) from about 50 to about 300 pbw of a predominantly aliphatic hydrocarbon processing oil, and (d) from about 5 to about 150 pbw of a polyolefin.

16 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SOFT PAINTABLE POLYMER COMPOSITION

BACKGROUND OF THE INVENTION

This invention relates to polymer compositions containing hydrogenated block copolymers of vinyl aromatic hydrocarbons and conjugated dienes, processing oils and polyolefins. More particularly, the present invention relates to such polymers which are made both soft and paintable.

Polymer compositions containing the above block copolymers, processing oils and polyolefins are well known. They usually additionally comprise a filler compound. Such compositions have been used in the automotive industry for molded parts such as grommets, sound barriers and air ducts. However, these compositions are relatively hard and are not easy to paint with polyurethane-based paints. Since these compositions do have other advantages, such as very good low temperature brittleness, which make them quite useful in many applications, including automotive applications, it would be a distinct advantage if a way could be found to make such compositions paintable and soft so that they could be used in the manufacture of padded car door parts, arm rests and other materials which require the combined characteristics of such polymers including flexibility, excellent resistance to ozone, UV radiation and weather, good heat and chemical resistance and are easily processable. The advantages of such compositions are described in "Automotive Applications of Styrenic Thermoplastic Elastomers" by Geoffrey Holden and Kyle H. Speer, *Automotive Polymers and Design,* 58, No. 3, February 1989.

In many automotive interior applications, there is a need for parts with a rigid substructure and a soft surface. Some examples are steering wheels, instrument panels, air bag doors and consoles. Such parts can be both functionally and aesthetically effective. Functionally, they can serve to reduce injuries caused by collisions. Aesthetically, they give a more attractive appearance and luxurious feel to the interior, which many buyers prefer to the current systems. For both these reasons, the use of soft surfaces molded over a rigid substructure is growing.

SUMMARY OF THE INVENTION

The present invention renders the above-described polymer compositions paintable with polyurethane paints which is currently not possible. In addition, the present invention creates soft paintable polymers which are useful for dashboards, door panels, consoles, air-bag doors, glove compartment doors and the like.

The soft paintable polymer composition of the present invention comprises from 0 to about 90 parts by weight (pbw) of a hydrogenated block copolymer comprised of at least one vinyl aromatic hydrocarbon and at least one conjugated diene, from about 10 to about 100 pbw of a functionalized hydrogenated block copolymer of at least one vinyl aromatic hydrocarbon and at least one conjugated diene, wherein the total amount of the two block copolymers must add up to 100 pbw. The composition also comprises from about 50 to about 300 pbw of a predominantly aliphatic hydrocarbon processing oil and from about 5 to about 150 pbw of a polyolefin. In the most preferred embodiment, the block copolymer is functionalized by grafting maleic acid or maleic anhydride onto the conjugated diene block after hydrogenation.

DETAILED DESCRIPTION OF THE INVENTION

The base polymers of the present invention are block copolymers of conjugated dienes and vinyl aromatic hydrocarbons. Such block copolymers may be multiblock copolymers of varying structures containing various ratios of conjugated dienes to vinyl aromatic hydrocarbons including those containing up to about 50% by weight of vinyl aromatic hydrocarbon. Thus, multiblock copolymers may be utilized which are linear or radial, symmetric or asymmetric, and which have structures represented by the formulae, A-B, A-B-A, A-B-A-B, B-A, B-A-B, B-A-B-A, $(A\text{-}B)_{0,1,2,}$ . . . B-A and the like wherein A is a polymer block of a vinyl aromatic hydrocarbon and B is a polymer block of a conjugated diene that has been hydrogenated.

The block copolymers may be produced by any well known block polymerization or copolymerization procedures including the well-known sequential addition of monomer techniques, incremental addition of monomer technique or coupling technique as illustrated in, for example, U.S. Pat. Nos. 3,251,905, 3,390,207, 3,598,887 and 4,219,627 which are herein incorporated by reference. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the appropriation of multiblock copolymers containing tapered copolymer blocks including U.S. Pat. Nos. 3,251,905, 3,265,765, 3,639,521 and 4,208,356 which are herein incorporated by reference.

Conjugated dienes which may be utilized to prepare the polymers and copolymers include those having from 4 to 8 carbon atoms and also include 1,3-butadiene, 2-methyl-1,3-butadiene(isoprene), 2,3-dimethyl-1, 3-butadiene, 1,3-pentadiene, 1,3-hexadiene and the like. Mixtures of such conjugated dienes may also be used. The preferred conjugated dienes are 1,3-butadiene and isoprene.

Vinyl aromatic hydrocarbons which may be utilized to prepare copolymers include styrene, o-methylstyrene, p-methylstyrene, p-tert-butylstyrene, 1,3-dimethylstyrene, alpha-methylstyrene, vinylnapthalene, vinylanthracene and the like. The preferred vinyl aromatic hydrocarbon is styrene.

While these block copolymers have a number of outstanding technical advantages, one of their principle limitations lies in their sensitivity to oxidation. This can be minimized by hydrogenating the copolymers, especially in the diene blocks. The hydrogenation of these polymers and copolymers may be carried out by a variety of well established processes including hydrogenation in the presence of such catalysts as Raney Nickel, noble metals such as platinum, palladium and the like and soluble transition metal catalysts. Titanium biscyclopentadienyl catalysts may also be used. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986, 4,226,952 and Re. 27,145, the disclosures of which are herein incorporated by reference. The polymers are hydrogenated in such a manner as to produce hydrogenated polymers having a residual unsaturation content in the polydiene block of less than about 20%, and preferably as close to zero percent as possible, of their original unsaturation content prior to hydrogenation.

The base polymer may be used in an amount up to 90% of the total amount of functionalized and unfunctionalized polymer present in the composition or it may not be used at all. It is preferred that the base polymer be used in an amount from about 50% to about 90% of the total amount of functionalized and unfunctionalized block copolymer present in the composition. One reason why it is preferred to use unfunctionalized block copolymer is that it is less expensive than functionalized block copolymer. If less than about 50% of the unfunctionalized polymer is used, then the total cost of the product may be uneconomic and if more than about 90% of this polymer is used then there may be insufficient functionality to achieve the desired effect. It is preferred that this polymer be relatively high in molecular weight because such polymers have better upper service temperatures, i.e. they resist distortion at higher temperatures better than lower molecular weight polymers.

In general, any materials having the ability to react with the base polymer are operable for purposes of the present invention to make the functionalized polymers used herein. In order to incorporate functional groups into the base polymer, monomers capable of reacting with the base polymer, for example, in solution or in the melt by free radical mechanisms or other are necessary. Monomers may be polymerizable or nonpolymerizable. However, preferred monomers are nonpolymerizable or slowly polymerizable.

The functionalized block copolymers of the present invention are hydrogenated block copolymers as described above which have been functionalized, i.e. reacted with various functional groups. Among the functional groups which may be reacted with such block copolymers to produce a functionalized block copolymer useful in the present invention are acid or anhydride groups or derivatives thereof which are grafted onto a conjugated diene block, carboxyl groups which are added onto the vinyl aromatic hydrocarbon blocks, sulfonate groups, alcohol groups, imides, acid chlorides, aldehydes, amines, amides, epoxy groups, isocyanates and esters. Functionalized polymers containing carboxyl groups reacted onto the vinyl aromatic hydrocarbon block are described in U.S. Pat. No. 4,868,245 which is herein incorporated by reference. Functionalized polymers incorporating sulfonate groups into the polymer are described in commonly assigned copending application "Sulfonated Block Copolymers", Ser. No. 198,543, filed May 24, 1988.

The preferred monomers for functionalizing the polymers of the present invention are those which can be grafted onto the polymer in free radical initiated reactions. Such preferred polymers include acids or anhydrides or derivatives thereof such as carboxylic acid groups and their salts, anhydrides, esters, imide groups, amide groups, acid chlorides and the like. Such monomers and functionalized polymers incorporating them are described in U.S. Pat. No. 4,578,429 which is herein incorporated by reference. The preferred modifying monomers are unsaturated mono- and polycarboxylic-containing acids and anhydrides and other derivatives thereof. Examples of such monomers include maleic acid, maleic anhydride, fumaric acid and the other materials mentioned in the above-referenced patent.

The functionalized copolymers of the present invention must comprise at least about 10% of the total amount of the block copolymers in the composition in order to achieve the advantages of the present invention, i.e., in order to render the compositions sufficiently paintable by polyurethane based paints. If less than 10% is used, then the functionality of the final product may be insufficient to give good paint adhesion. The functionalized block copolymer may comprise up to 100% of the block copolymer in the composition. However, it is preferred that the functionalized block copolymer comprise from about 10% to about 50% of the total amount of block copolymer in the composition because the functionalized polymers are often of low molecular weight and so give products with poor upper service temperatures if large amounts are used.

The composition must contain a hydrocarbon processing oil which is predominantly aliphatic in nature in order to make the composition sufficiently soft for the uses intended, i.e., door panels, dashboards, consoles, map pocket covers, seatbacks, air bag doors, etc. Assuming that the total amount of block copolymer is 100 parts by weight, the processing oil is present in the composition in an amount from about 50 to about 300 parts by weight. If less than 50 parts by weight is used, then the composition will be too hard and if more than about 300 parts by weight are used, then the oil may bleed out. It is preferred that the amount of oil present range from about 150 to about 250 parts by weight because this range has been found to give products in the required hardness range. It is preferred that the hydrocarbon processing oil have a low volatiles content because oil that volatilizes will cause "fogging" on the automobile glass surface.

A polyolefin is required to be included in the composition of the present invention so that the composition can be injection molded easily. We theorize that it performs this function in the melt by acting as a second phase that is swollen by some of the oil. It also improves upper service temperature and solvent resistance. Polypropylene is the preferred polyolefin for use in the present invention, but other polyolefins such as polyethylene, poly-4-1-methylpentene and others could be used and also blends of such polyolefins could be used.

The polyolefin may be present in an amount from about 5 to about 150 parts by weight, assuming that the total amount of block copolymer is 100 parts by weight. If less than about 5 parts by weight is used, then the composition will be difficult to injection mold because the amount of the second phase will be insufficient to enhance moldability. If more than about 150 parts by weight is used, then the composition will be too hard for the intended use. It is preferred that the polyolefin be present in an amount from about 10 to about 50 parts by weight because this gives a very soft product that is usually desired for the application.

It is very common that such compositions contain filler materials such as mica, calcium carbonate, talc, wollastonite, etc. in order to bring down the cost of the composition and, when not present in large amounts, improve moldability. In the present situation, no more than about 20% of the composition should be comprised of a filler because if more than that amount is used, then the composition will not be sufficiently soft for the intended use. Accordingly, it is preferred that the filler comprise than less than about 10% of the total composition. However, there is some advantage to having the filler present in that it assists in making the polymer sufficiently processable and prevents "blocking" of the ingredients during manufacture.

The polymer composition of the present invention is relatively soft and paintable and can be injection molded to produce solid parts which are relatively soft and can be easily painted with polyurethane based Paints. After injection molding, this composition has the advantage that the paint will not peel from the surface, the low temperature brittleness is very good and it will stick well when it is injection molded over polyolefin parts such as polypropylene parts. The composition may be used in the production of refrigerator door handles, appliance handles, furniture arm rests, luggage, etc. - anything in which a soft surface which can be painted is important. However, the primary intended use for this composition is in the manufacture of automobile interior parts having a soft surface by insert or coinjection molding the polymer against a relatively stiff thermoplastic, such as polypropylene, to which the polymer composition will adhere or even to one to which it will not adhere if mechanical interlocks or surface treatments are used. It also is possible to insert mold the polymer composition of the present invention to molded metal parts.

EXAMPLES

The base polymer for all of the polymer compositions utilized in these examples is KRATON® G1651 rubber. This is a high molecular weight SEBS block copolymer. The aliphatic hydrocarbon processing oil was either PENRECO® 4434 oil or 4465 oil which are high molecular weight refined mineral oils free of aromatics. The polypropylene used herein was a polypropylene homopolymer produced by Shell Oil Company except in two cases wherein HUNTSMAN 5520 polypropylene homopolymer was used.

In some cases, the functionalized block copolymer was KRATON® FG1901X block copolymer which is a low molecular weight SEBS block copolymer grafted with maleic anhydride (approximately 1.7%). In Table II, KRATON® G1726 and KRATON® G1657 polymers are two different low molecular weight diblock/triblock block copolymers. Although these polymers are produced without maleation, they were maleated subsequently.

Table I gives the composition of three different paint test samples which did not include any functionalized block copolymer. Table II gives the composition of four different paint test samples which utilize different functionalized block copolymers within the scope of the present invention.

TABLE I

COMPOSITION OF PAINT TEST SAMPLES

| Sample # | HD-4262 | HD-4277 | HD-4278 |
|---|---|---|---|
| Ingredients | | | |
| High Molecular Weight S-EB-S Block Copolymer (KRATON® G1651) | 31.8% | 31.5% | 31.5% |
| Low Molecular Weight Functionalized S-EB-S Block Copolymer (KRATON® FG1901X) | — | — | — |
| Polypropylene (HUNTSMAN 5520) | 4.5% | 4.5% | 4.5% |
| Aliphatic Hydrocarbon Processing Oil (PENRECO® 4434) | — | — | 63% |

TABLE I-continued

COMPOSITION OF PAINT TEST SAMPLES

| Sample # | HD-4262 | HD-4277 | HD-4278 |
|---|---|---|---|
| Aliphatic Hydrocarbon Processing Oil* (PENRECO® 4465) | 63% | 63% | — |
| Stabilizers | — | 1% | 1% |

*Special Low Volatility Type

TABLE II

COMPOSITION OF PAINT TEST SAMPLES

| Sample # | HD-4363 | HA-4388 | HD-4361 and HD-4362 |
|---|---|---|---|
| Ingredients | | | |
| High Molecular Weight S-EB-S Block Copolymer (KRATON® G1651 Rubber) | 24% | 20% | 6% |
| Low Molecular Weight Functionalized S-EB-S Block Copolymer (KRATON® FG1901X Rubber)* | — | — | 6% |
| Low Molecular Weight Functionalized S-EB/S-EB-S Experimental Block Copolymer (1726) (About 1.7% maleation)** | 6% | — | — |
| Low Molecular Weight Functionalized S-EB/S-EB-S Experimental Block Copolymer (1657) (About 1.0% maleation)*** | — | 10% | — |
| Polypropylene (SHELL) | 4.5% | 4.5% | 4.5% |
| Aliphatic Hydrocarbon Processing Oil (PENRECO® 4434) | 60% | 60% | 60% |
| Stabilizers | 1% | 1% | 1% |
| Calcium Carbonate Dusting Agent | 4.5% | 4.5% | 4.5% |

All these pelletized products were also dusted with HYSIL 233, an amorphous silica.
*FG1901X rubber was finely ground for HD-4262 and unground for HD-4361.
**Maleated G1726 rubber
***Maleated G1657 rubber All of these paint test samples were injection molded onto a polypropylene injection molded part and then painted with a polyurethane based paint. All of these polymers produced soft surfaces. In order to test the paintability, the painted surfaces of the molded parts were cut with a razor blade to give an X cut, and the ability of the paint to resist being peeled away from the intersection point of the X was assessed. The paint test samples which contain no functionalized block copolymer (HD-4262, 4277 and 4278) showed poor adhesion of the paint to the polymer without the use of a tie coat. The paint samples which utilize the functionalized block copolymer showed better paint adhesion without the use of a tie coat. The compositions which utilized KRATON® FG1901X rubber (HD-4361 and 4362) were superior to the compositions which utilized the other functionalized block copolymers (HD-4363 and 4388).

We claim:

1. A soft paintable polymer composition consisting essentially of:

(a) from about 50 to about 90 parts by weight (pbw) of a hydrogenated block copolymer comprised of at least one vinyl aromatic hydrocarbon and at least one conjugated diene, (b) from about 10 to about 50 pbw of a functionalized hydrogenated block copolymer comprised of at least one vinyl aromatic hydrocarbon and at least one conjugated diene, wherein (a) and (b) must add up to 100 pbw, (c) from about 50 to about 300 pbw of a predominantly aliphatic hydrocarbon processing oil, and (d) from about 5 to about 150 pbw of polypropylene.

2. The polymer composition of claim 1 wherein the oil is present in an amount from about 150 to about 250 pbw and the polypropylene is present in an amount from about 10 to about 50 pbw.

3. The polymer composition of claim 2 which also comprises up to about 20% weight of a filler.

4. The polymer composition of claim 3 which contains not more that 10% weight of a filler.

5. The polymer composition of claim 1 wherein the block copolymer is functionalized by grafting at least one acid or anhydride group or a derivative thereof onto a conjugated diene block.

6. The polymer composition of claim 5 wherein the acid or anhydride group or derivative thereof is selected from the group consisting of mono- and polycarboxylic-containing acids, anhydrides and derivatives thereof.

7. The polymer composition of claim 6 wherein the acid or anhydride group or derivative group thereof is maleic anhydride.

8. The polymer composition of claim 7 wherein the oil is present in an amount from about 150 to about 250 pbw and the polypropylene is present in an amount from about 10 to about 50 pbw.

9. A process for making a soft paintable molded product which comprises:

(a) making a polymer composition consisting essentially of:

(1) from about 50 to about 90 parts by weight (pbw) of a hydrogenated block copolymer comprised of at least one vinyl aromatic hydrocarbon and at least one conjugated diene, (2) from about 10 to about 50 pbw of a functionalized hydrogenated block copolymer comprised of at least one vinyl aromatic hydrocarbon and at least one conjugated diene, wherein (a) and (b) must add up to 100 pbw, (3) from about 50 to about 300 pbw of a predominantly aliphatic hydrocarbon processing oil, and (4) from about 5 to about 150 pbw of polypropylene; and (b) forming the composition into a molded product.

10. The polymer composition of claim 9 wherein the oil is present in an amount from about 150 to about 250 pbw and the polypropylene is present in an amount from about 10 to about 50 pbw.

11. The polymer composition of claim 10 which also comprises up to about 20% by weight of a filler.

12. The polymer composition of claim 11 which contains not more than 10% by weight of a filler.

13. The polymer composition of claim 9 wherein the block copolymer is functionalized by grafting at least one acid or anhydride group or a derivative thereof onto a conjugated diene block.

14. The polymer composition of claim 13 wherein the acid or anhydride group or derivative thereof is selected from the group consisting of mono- and polycarboxylic-containing acids, anhydrides and derivatives thereof.

15. The polymer composition of claim 14 wherein the acid or anhydride group or derivative group thereof is maleic anhydride.

16. The polymer composition of claim 15 wherein the oil is present in an amount from about 150 to about 250 pbw and the polypropylene is present in an amount from about 10 to about 50 pbw.

* * * * *